United States Patent [19]

Wilson, Sr. et al.

[11] 4,415,543

[45] Nov. 15, 1983

[54] PROCESS FOR TREATING PHOSPHO-GYPSUM WASTE PRODUCT FROM WET-ACID PROCESS OF MAKING PHOSPHORIC ACID

[76] Inventors: Eddie K. Wilson, Sr., 6915 Silver Maple Cove, Memphis, Tenn. 38119; Silvio J. Spigolon, 7155 Riverdale Cove, Memphis, Tenn. 38138

[21] Appl. No.: 342,474

[22] Filed: Jan. 25, 1982

Related U.S. Application Data

[63] Continuation-in-part of Ser. No. 120,825, Feb. 12, 1980, Pat. No. 4,312,842.

[51] Int. Cl.$^3$ .......................... C01F 1/00; C01F 5/10; C01B 25/16

[52] U.S. Cl. .................................... 423/178; 423/304; 423/320; 423/322; 423/522; 423/532; 423/541 R; 423/483; 210/712; 210/915

[58] Field of Search ............... 423/178, 319, 320, 483, 423/484, 322, 323, 522, 304, 541 R, 532; 210/712, 915

[56] References Cited

U.S. PATENT DOCUMENTS

| | | | |
|---|---|---|---|
| 2,202,414 | 5/1940 | Barnes | 423/541 |
| 2,222,740 | 11/1940 | Bornemawn et al. | 423/541 |
| 2,528,103 | 10/1950 | Willson | 423/522 |
| 2,687,946 | 8/1954 | Manning et al. | 423/177 |
| 2,687,947 | 8/1954 | Manning et al. | 423/177 |
| 3,087,790 | 4/1963 | Wheelock et al. | 23/186 |
| 3,260,035 | 7/1966 | Wheelock et al. | 55/73 |
| 3,326,633 | 6/1967 | Canothers et al. | 423/172 |
| 3,547,581 | 12/1970 | Gauster et al. | 423/55 |
| 3,607,036 | 9/1971 | Foecking et al. | 23/177 |
| 3,607,045 | 9/1971 | Wheelock et al. | 23/186 |
| 3,870,786 | 3/1975 | Kidde | 423/483 |
| 4,040,853 | 8/1977 | Binder et al. | 423/541 |
| 4,059,674 | 11/1977 | Lopker | 423/167 |
| 4,102,989 | 7/1978 | Wheelock | 423/541 |

OTHER PUBLICATIONS

"Sulfuric Acid from Anhydrite", I & EC, vol. 49, No. 8, Aug. 1957.
"Manufacture of Cement from Industrial Byproducts", Chemistry and Industry, Feb. 1971.
"Production of Sulphuric Acid and Cement from Phosphogypsum Using the SJ Process", Chemical Age of India, vol. 27, 1976.
"The Simultaneous Production of Yellow Phosphorous and Alumina Cement", Chemical Abstracts, 1964.
"Getting Rid of Phosphogypsum–II", Phosphorous and Potassium, No. 89, May/Jun. 1977.

*Primary Examiner*—Gregory A. Heller
*Attorney, Agent, or Firm*—Gravely, Lieder & Woodruff

[57] ABSTRACT

This disclosure concerns a process for treating phospho-gypsum waste product from the wet process method of making phosphoric acid including the steps of water washing the phospho-gypsum to remove all but an acceptable level of fluorine before the phospho-gypsum is calcined. The process allows the use of high sulfur coal for the production of steam if desired for use in the overall process. The process also allows for production of $SO_3$ from part of the phospho-gypsum in an electric furnace to enrich the $SO_2$ stream for making sulfuric acid.

9 Claims, 2 Drawing Figures

PROCESS FOR TREATING PHOSPHO-GYPSUM WASTE PRODUCT FROM WET-ACID PROCESS OF MAKING PHOSPHORIC ACID

REFERENCE TO PRIOR APPLICATION

This application is related to, contains subject matter in common with, and is a continuation-in-part of Ser. No. 120,825 filed Feb. 12, 1980 entitled PROCESS FOR MANUFACTURE OF PHOSPHORIC ACID WITH RECOVERY OF COPRODUCTS (now U.S. Pat. No. 4,312,842 dated Jan. 26, 1982).

BACKGROUND OF THE INVENTION

As discussed in detail in co-pending application Ser. No. 120,825, now U.S. Pat. No. 4,312,842, (the substance of which is herein incorporated by reference), this invention relates to the wet-process or acid process of making phosphoric acid, and particularly relates to the treatment of the phospho-gypsum waste product to recover the fluorine and phosphorous and leave an environmentally acceptable and useful calcium residue.

The prior art is succinctly described in co-pending application Ser. No. 120,825 (U.S. Pat. No. 4,312,842) and the present application is different from and in certain aspects an improvement on Ser. No. 120,825 (U.S. Pat. No. 4,312,842) in that we remove most of the fluorine values in the liquid phase by washing and drying prior to calcining the phospho-gypsum waste product.

In our present improved process, there is an acceptable level of fluorine in the sulfur bearing gases which are used to make the sulfuric acid used in the overall process for making phosphoric acid. The phospho-gypsum is water washed so that when the phospho-gypsum leaves the preheater-dryer (prior to calcining) all but the acceptable level of the fluorine has been removed.

Another advantage of this process is that high sulfur coal can be used in the calciner which has the double advantage of using a cheap fuel and also enhancing the sulfur gas output from the calciner to the acid plant.

Another advantage of this invention is that the process can be manipulated so that if it is desired to manufacture steam for use in the overall process, the amount of fossil fuel burned in the preheater-dryer and/or the calciner can be increased to provide the additional heat energy. This will increase the amount of combustion gas produced. In the event the sulfur content of gas stream from the calciner is so low that it does not produce the desired concentration, part of the phospho-gpysum may be left uncalcined and passed into the electric furnace. There, the sulfur in the phospho-gypsum will evolve as a nearly pure $SO_3$ gas since there are no combustion gases evolved in the furnace. Then the $SO_3$ from the electric furnace can be added to the $SO_2$ and oxygen-containing gas stream from the calciner to enhance the sulfur gas concentration to a level sufficiently high to make the manufacture of sulfuric acid efficient.

SUMMARY OF THE INVENTION

This invention is an improvement on the process of Ser. No. 120,825, (U.S. Pat. No. 4,312,842), which provides for treatment of phospho-gypsum waste product from phosphoric acid process to produce useful calcium silicates and which provides for the recovery of substantially all of the phosphorus and fluorine values and for the recovery of recycling of the sulfur values, in that the fluorine is removed prior to calcining so that the sulfur dioxide, $SO_2$, which is recovered and recycled is not contaminated.

DETAILED DESCRIPTION

Broadly speaking, as in Ser. No. 120,825 (U.S. Pat. No. 4,312,842) the process of the present invention involves the complete utilization of natural phosphate rock in commercially valuable products, leaving only common, innocuous, and ubiquitous gases as a residue. The presently used wet-acid process for using phosphate rock to manufacture phosphoric acid leaves a waste residue of impure phospho-gypsum which is uneconomical and is environmentally repugnant and hazardous. The improvements in the process, claimed in this invention, include complete utilization of the waste phospho-gypsum, regenerating all sulfur values, increasing phosphorus and fluorine recovery to nearly 100%, and recovering calcium values as calcium silicates.

The improved process will work with all types of natural phosphate rock. Following is a typical chemical analysis:

| Composition of Florida Phosphate Rock - 70/68 BPL (From - A. V. Slack, "Phosphoric Acid, Vol. 1, Pt. 1, 1968) | |
|---|---|
| CaO | 47.14% |
| $P_2O_5$ | 32.23 |
| $H_2O$ | 1.00 |
| $Fe_2O_3$ | 1.26 |
| $Al_2O_3$ | 0.96 |
| Organic | 1.74 |
| $SiO_2$ | 8.72 |
| $CO_2$ | 2.93 |
| $F_2$ | 3.09 |
| $SO_3$ | 0.93 |
| | 100.00% |

Following are basic reactions involved in the wet process method of making phosphoric acid. As an illustration, based on one ton (2000 lbs.) of phosphate rock having the composition shown above, the noted amounts of sulfuric acid ($H_2SO_4$) and water are added to the reaction:

| Quantities of Reactants - Per Ton (2000 lbs.) Phos. Rock: | | | | | | |
|---|---|---|---|---|---|---|
| (1) $Ca_3(PO_4)$ | + | $3H_2SO_4$ | | $2H_3PO_4$ | + | $3CaSO_4$ |
| 1408.6# | | 1336.2# | = | 889.9# | + | 1854.9# |
| (2) $CaF_2$ | + | $H_2SO_4$ | | 2HF | + | $CaSO_4$ |
| 127.0# | + | 159.6# | = | 65.1# | + | 221.5# |
| (3) 6HF | + | $SiO_2$ | | $H_2SiF_6$ | + | $2H_2O$ |
| 65.1# | | 32.6# | = | 78.1# | + | 19.6# |
| (4) $CaCO_3$ | + | $H_2SO_4$ | | $CO_2$ | + | $H_2O$ + $CaSO_4$ |
| 133.2 | + | 130.5 | = | 58.6# | + | 24.0# + 181.1# |

| | Per Ton Phos. Rock |
|---|---|
| Add - Phosphate Rock | 2000# |
| - $H_2SO_4$ (100% Basis) | 1626.3# |
| - $H_2O$ | 542.3# |
| To Yield - $H_3PO_4$ (100% Basis) | 889.9# |
| $P_2O_5$ (100% Basis) | 644.5# |
| Product Acid (30% $P_2O_5$) | 2014.1# |
| (HF) | (65.1#) |
| $H_2SiF_6$ | 78.1# |

| -continued | |
| --- | --- |
| CO$_2$ Gas | 58.6# |
| CaSO$_4$.2H$_2$O | 2895.0# |
| (CaSO$_4$) (2257.5 + 31.6) | (2289.1#) |
| SiO$_2$ (174.4 − 32.6) | 141.8# |
| Al$_2$O$_3$ | 19.2# |
| Fe$_2$O$_3$ | 25.2# |
| Phospho-gypsum | 3081.2# |

From this example, it may be seen that the waste product gypsum far exceeds the useful product acid in quantity.

Figure 2:
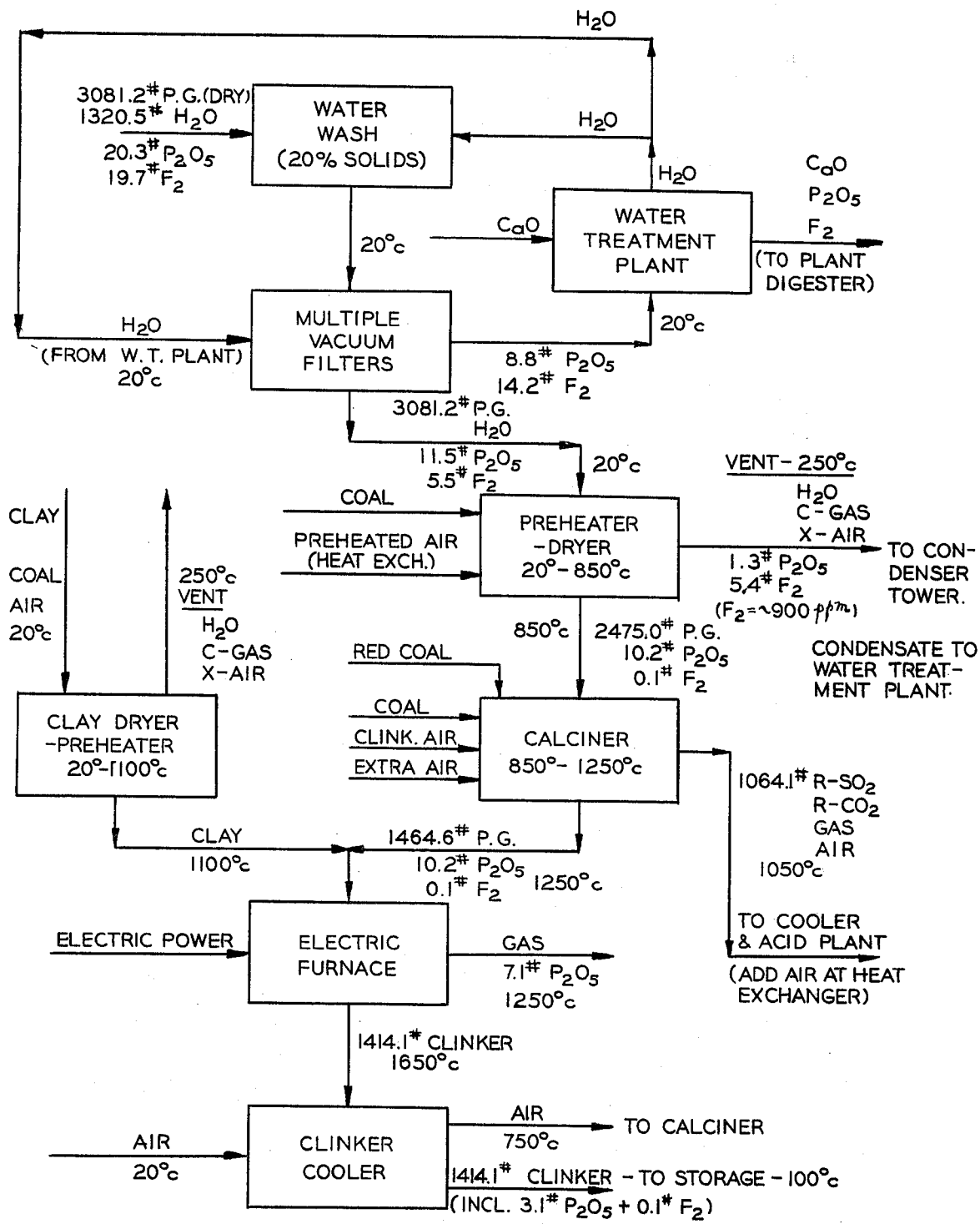
FIG. 2 is a schematic diagram of a flow chart for the improved process of treating the phospho-gypsum from the process of FIG. 1.

Because the conventional process, and most commercial processes of similar type, do not yield 100% of the available products in the natural ore, the phospho-gypsum waste may contain some unreacted ore, perhaps as much as 3 to 5%. Also, the liquid phase of the phospho-gypsum contains fluorine compounds and residual phosphoric and sulfuric acid. The purpose of the water wash and vacuum filter combined with the preheater (FIG. 2) is to remove a portion of the P$_2$O$_5$ and substantially all of the fluorine values from the phospho-gypsum before it goes to the calciner where the SO$_2$ is produced. This allows uncontaminated SO$_2$ to be produced for the acid plant.

As shown in the typical materials analysis given hereinbefore, the raw materials for phosphoric acid manufacture are phosphate rock, sulfuric acid, and water. The phosphate rock contains valuable elements consisting of phosphorus, fluorine, and calcium, which are recovered in the process of this invention. The impurities in the rock are mainly iron-aluminum-silica, all of which are combined with the calcium to form calcium silicate-containing compounds. The chemistry of the calcium silicates may be varied, over a wide range, by the addition of desired and necessary ingredients, usually inorganic oxides, to the electric furnace during the fusion process. The dust from the calcining furnace and, if desired, the dried sludge from the phosphoric acid may also be added to the molten product in the electric furnace and thus incorporated into the final calcium silicate co-product(s).

The sulfuric acid used in the process may be regenerated from an in-house sulfuric acid plant or may be purchased and received from an out-of-plant source. Sulfur is the basic raw material for manufacture of sulfuric acid, whether by the contact process or the nearly obsolete chamber process. This invention makes no claim for improvement of any part of the sulfuric acid process. In the phosphoric acid plant, all of the sulfuric acid used reacts with the calcium of the phosphate rock to form calcium sulfate, although a small amount may be lost in the product acid or as residue with the waste gypsum.

It is possible within the process of this invention to establish a production cycle between the sulfuric acid, the phosphate rock, and the phospho-gypsum whereby the sulfur content is completely re-cycled, obviating the need for replenishment or disposal. If a high sulfur fossil fuel is used, then additional sulfur will enter the system in the form of sulfur dioxide. If an in-house sulfuric acid plant exists, the phosphoric acid manufacturer may choose to calcine part of an existing stockpile of waste phospho-gypsum, in addition to his daily production, to make sulfuric acid for sale or other applications, thereby alleviating an existing environmental problem. If out-of-plant sources are used, then the sulfur dioxide from the present invention, both from calcination and from combustion of fuel, may be processed to merchantable forms of sulfur, such as elemental sulfur or hydrogen sulfide, or sulfur dioxide or sulfur trioxide.

Heat energy for the entire process can be derived electrically or by burning any convenient fossil fuel including low cost high sulfur levels. If combustion gases are used for heat transfer in the preheater-dryer and/or in the calciner, a high sulfur content fuel, which otherwise would be uneconomical to use elsewhere because of the evolution of high amounts of sulfur dioxide, would be most acceptable in this process and may even be sought after to provide additional sulfur value recovery in the sulfur-sulfuric acid plant making more low sulfur fuels available for useage elsewhere.

Figure 1:
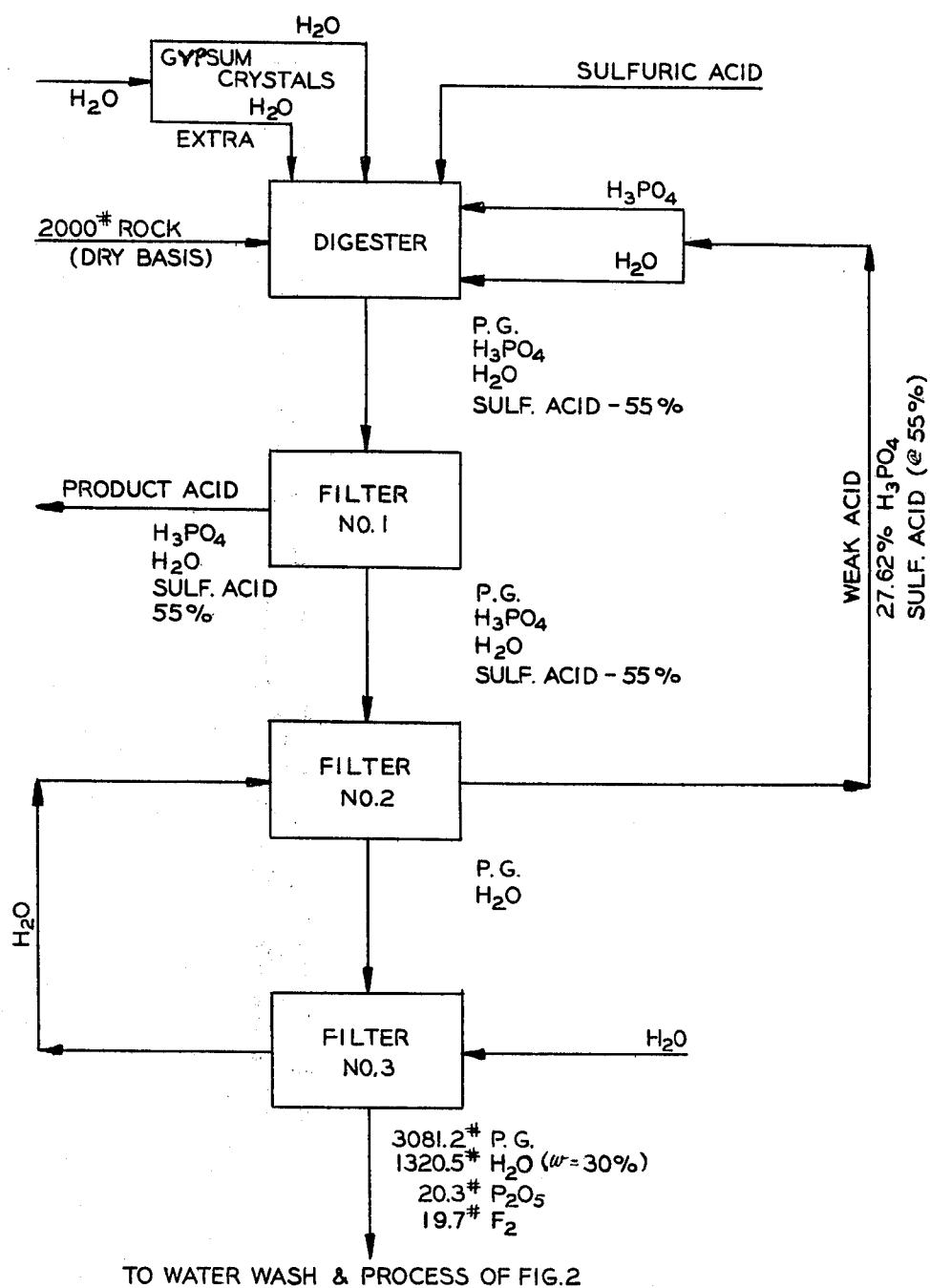
FIG. 1 is a schematic diagram of a flow chart for a typical phosphoric acid plant.

This improved process for phosphoric acid manufacture by the wet-acid process, with recovery of all co-products, follows a fairly conventional sequence through the acid filtration step. The steps in this process shown in FIG. 1 are detailed as follows:

(1) Commercial beneficiated phosphate rock is received at the phosphoric acid plant and is ground with a dilute solution of phosphoric acid from a subsequent filtration step in the process, (Filter No. 2) before being reacted in a digester tank with sulfuric acid, diluted with phosphoric acid to produce a 55% strength sulfuric acid. The acid digestion usually requires 4 to 8 hours with constant agitation. The temperature is maintained at 75° to 80° C. to prevent partial dehydration of the gypsum that is formed. In some plants, a slightly higher temperature is used to form the calcium sulfate hemi-hydrate in a slightly more efficient process. The sulfuric acid for this step comes from a subsequent filtration step in the process (Filter No. 2). The product from the digester is phosphoric acid, impure phospho-gypsum, sulfuric acid and water. The fluorine and phosphorus values are in both the liquid and solid phases of the phospho-gypsum and are carried with it.

(2) The phosphoric acid-gypsum slurry is passed through a filtration device (Filter No. 1), usually a vacuum filter, where most of the impure phosphoric acid is removed, leaving a phospho-gypsum residue, which exists as fine crystalline particles.

(3) Dissolved in the phosphoric acid filtrate are some iron, aluminum, calcium, and other compounds. Most of these compounds may be separated from the phosphoric acid as a sludge by precipitation and filtration. This sludge may be returned to the digester to recover acid soluble values. The insoluble residue is then further processed, with the phospho-gypsum, recover the remaining values.

(4) The phosphoric acid also contains a small amount of radioactive substances. Several patented and/or proprietary processes exist for recovery of the radioactive substances. This part of the process is not claimed in this invention, however our process does not preclude its use.

(5) The phosphoric acid filtrate is evaporated to the desired concentration and used, in another process, or stored and sold.

(6) In the improved process of this invention, the phospho-gypsum filter residue from FIG. 1 is washed with water (FIG. 2) at about 20% solids so that an easily pumped slurry is obtained. The residue contains phospho-gypsum, phosphorus and fluorine values. The water to the water wash comes from a water treatment plant where it has been treated with calcium oxide or other medium to remove the phosphorus and fluorine values. From the water wash, the solids and liquid are passed to a series of vacuum filters where the filtrate, which contains a part of the phosphorus ($P_2O_5$) and a part of the fluorine ($F_2$) values, is removed and passed to the water treatment plant previously mentioned. The filtrate is, as previously discussed, treated with CaO or other appropriate medium and then the $P_2O_5$ and $F_2$ compounds are removed from the filtrate before it is recycled, part to the water wash and part to the filters.

(7) The filter cake from the filter system contains the phospho-gypsum which originally entered the water wash, part of the $P_2O_5$ in the original mass and a part of the fluorine values. This is passed to a preheater and dryer where it is raised to a temperature of about 850° C. In the preheater, the remainder of the fluorine values in the liquid phase are released along with the water vapor as gases. If coal or other fossil fuel is burned to heat the material in the preheater, the products of combustion of the fuel leave the preheater as combustion gases and heated excess air, combined with the other gases. The gases are then cooled sufficiently to condense the water vapor and the associated fluorine. These are recovered and sent to the water treatment plant for recovery of the fluorine.

(8) The reside leaves the preheater at about 850° C. and consists of dry phospho-gypsum, about one-half of the original $P_2O_5$ values, and a small amount of fluoride values. The residue is then, without cooling, sent directly to a calciner where the phospho-gypsum material is heated from 850° C. to about 1250° C. If coal or other fossil fuel is used, this releases $SO_3$ which then oxidizes to $SO_2$ along with other combustion gases and excess heated air. The $SO_2$ containing gas stream goes to a cooler and a sulfuric acid plant if one is in-house at the plant. The sulfuric acid generated from the $SO_2$ can be used in the process shown in FIG. 1, or it can be processed and sold. The composition of the gas stream, especially the sulfur dioxide and the oxygen contents, must be matched to the requirements of the sulfuric acid plant. Most modern sulfuric acid plants need 10% $SO_2$ and 10% $O_2$, to operate efficiently. It is imperative that the fluorine level in the gas stream be kept below that which will cause damage to the catalyst used in the system.

(9) The calciner residue is mixed with inorganic oxides in the form of clay which has been preheated to about 1100° C. in a clay preheater and the mixture is fed into an electric furnace where it is melted at a temperature of up to 1650° C. A good portion of the $P_2O_5$ values are gasified, removed from the furnace, condensed, recovered, and stored for future use or sale. The electric furnace may be of any design, i.e., induction, resistance, arc or plasma-arc that will permit the necessary energy transfer, at the required temperature, for melting the materials. The preferred type is the direct arc type using plasma arc torches, although other types of electric furnaces may be used.

(10) If the $SO_2$ containing gas stream from the calciner is to be used directly in a contact process sulfuric acid plant, and if the composition of the gas stream is deficient in $SO_2$, then part of the phospho-gypsum in the calciner may be left uncalcined. The uncalcined material passed to the electric furnace will calcine there, evolving a nearly pure $SO_3$ gas because of the neutral atmosphere that can be maintained in the furnace. The nearly pure $SO_3$ gas can then be added to the calciner gas stream, along with outside air or oxygen, if necessary, to modify it to the desired composition. The clinker from the electric furnace is deposited in a clinker cooler where it is cooled with air and the air is heated by its contact with the clinker and is passed to the calcining step.

What is claimed is:

1. A process for treating phospho-gypsum waste product which is produced in the manufacture of phosphoric acid by the wet-acid process in which suitable phosphate rock is treated with sulfuric acid, comprising:
    (a) washing phospho-gypsum waste product from the production of phosphoric acid with water to remove a portion of the fluorine values and part of the $P_2O_5$ values;
    (b) subsequently recovering those values in a water treatment process;
    (c) heating the washed phospho-gypsum product to about 850° C. to remove an additional part of the $P_2O_5$ values and substantially all of the remaining fluorine values as a gas, and then returning the $P_2O_5$ values and fluorine values to the water treatment process; and
    (d) calcining the treated phospho-gypsum product at about 850° C. to about 1250° C. to recover sulfur values in the form of sulfur dioxide and sulfur trioxide.

2. The process of claim 1 wherein the solid phospho-gypsum waste product remaining after calcining in step (d) is melted in an electric furnace to gasify a substantial amount of the $P_2O_5$ values remaining therein, and recovering the said $P_2O_5$ values.

3. The process of claim 2 wherein inorganic oxides in the form of clay are added to the electric furnace melt to modify the composition of the melt.

4. The process of claim 2 wherein a part of the phospho-gypsum is calcined in the electric furnace in a neutral atmosphere to produce a concentrated sulfur gas stream for use in modifying the gas stream from the calciner by increasing the $SO_3$ content to make said gas stream acceptable for use in the sulfuric acid plant.

5. The process of claim 2 wherein a clinker from the electric furnace is cooled with air, which air is heated by its contact with said clinker, and the air is passed to the calcining step (d) to help raise the temperature of the feed materials to said calcining process.

6. The process of claim 2 wherein the electric furnace may be of the induction, resistance, arc or plasma-arc type.

7. The process of claim 1 wherein the fluorine and $P_2O_5$ values washed from the phospho-gypsum waste product in step (a) is recovered in step (b) by mixing lime with the wash water and forming a precipitate which is returned to the phosphoric acid process for reprocessing.

8. A process for treating phospho-gypsum waste product which is produced in a digester in the manufacture of phosphoric acid by the wet-acid process in which suitable phosphate rock is treated with sulfuric acid, comprising:
    (a) washing phospho-gypsum waste product from the production of phosphoric acid with water to remove a portion of the fluorine values and part of the $P_2O_5$ values;

(b) treating the wash water containing said fluorine and $P_2O_5$ values with CaO and forming a precipitate which is returned to the digester for reprocessing thus recovering said fluorine and $P_2O_5$ values;

(c) heating the washed phospho-gypsum product up to about 850° C. to separate in the gaseous form an additional part of the $P_2O_5$ values and substantially all of the remaining fluorine values from the phospho-gypsum product;

(d) condensing said $P_2O_5$ and fluorine values and returning said condensate to the wash water treating step (b);

(e) calcining the treated phospho-gypsum product at about 850° C. to about 1250° C. to recover sulfur values in the form of sulfur dioxide and sulfur trioxide;

(f) melting in an electric furnace the solid phospho-gypsum waste product remaining after calcining to gasify a substantial part of the $P_2O_5$ values remaining therein, condensing and recovering said $P_2O_5$ values.

9. The process of claim 8 wherein a part of the phospho-gypsum is calcined in the electric furnace in a neutral atmosphere to produce a concentrated sulfur gas stream for use in modifying the gas stream from the calciner by increasing the $SO_3$ content to make said gas stream acceptable for use in the sulfuric acid plant.

* * * * *